United States Patent
Srinivas et al.

(10) Patent No.: US 7,929,490 B1
(45) Date of Patent: Apr. 19, 2011

(54) METHOD AND SYSTEM FOR PAGING MOBILE DEVICES

(75) Inventors: Shilpa Kowdley Srinivas, Herndon, VA (US); Hemanth Balaji Pawar, Herndon, VA (US); Jong-Hak Jung, Herndon, VA (US); Anoop Goyal, Overland Park, KS (US); Gustavo Enrique Ulffe Whu, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 592 days.

(21) Appl. No.: 12/056,713

(22) Filed: Mar. 27, 2008

(51) Int. Cl.
*H04W 4/00* (2009.01)
*H04W 68/00* (2009.01)
(52) U.S. Cl. ........ 370/328; 455/458
(58) Field of Classification Search ........ None
See application file for complete search history.

(56) References Cited

U.S. PATENT DOCUMENTS

| | | | |
|---|---|---|---|
| 6,307,846 B1 | 10/2001 | Willey | |
| 6,366,573 B1 * | 4/2002 | Smith et al. | 370/349 |
| 6,477,382 B1 * | 11/2002 | Mansfield et al. | 455/458 |
| 6,687,285 B1 | 2/2004 | Jou | |
| 6,823,192 B2 | 11/2004 | Jou et al. | |
| 7,020,477 B2 | 3/2006 | Cramby et al. | |
| 7,149,535 B1 | 12/2006 | Chaturvedi et al. | |
| 7,668,136 B2 * | 2/2010 | Yu | 370/329 |
| 2003/0134649 A1 * | 7/2003 | Gau et al. | 455/458 |
| 2009/0176515 A1 * | 7/2009 | Willey et al. | 455/458 |

* cited by examiner

*Primary Examiner* — Anh-Vu Ly

(57) ABSTRACT

Methods and systems for improving the paging of wireless communication devices (WCDs) are introduced. A radio access network (RAN) begins transmitting a series of paging messages to a WCD, and determines that the WCD is operating on a new carrier frequency. The RAN proactively continues the series of paging messages on the new carrier frequency, without waiting for the prescribed interval between paging messages to expire. Alternatively, the RAN proactively restarts the series of paging messages on the new carrier frequency, without waiting for the prescribed interval between paging messages to expire. Both of these embodiments serve to reduce the delay involved in paging WCDs. The RAN may condition its behavior based on the WCD's profile.

16 Claims, 6 Drawing Sheets

METHOD AND SYSTEM FOR PAGING MOBILE DEVICES

BACKGROUND

In a wireless communication system, a radio access network (RAN) radiates to define one or more wireless coverage areas. Each wireless coverage area may serve a plurality of wireless communication devices (WCDs) via an air interface. In densely-populated areas, wireless service providers may improve wireless coverage by overlaying several wireless coverage areas on substantially the same physical locations. Each wireless coverage area preferably uses non-overlapping or orthogonal carrier frequencies or carrier frequency bands so that the wireless coverage areas do not interfere with one another.

For example, a wireless service provider may use six or seven non-overlapping carrier frequencies to provide coverage in a city center, while using only two or three such bands in the city's suburbs. But even in densely-populated cities, there may be pockets where fewer carrier frequencies are required. Similarly, in less densely-populated locations, certain locations such as shopping malls may attract large numbers of wireless users. Accordingly, wireless service providers may overlay additional carrier frequencies in these locations in order to serve the needs of their customers.

While overlaying multiple frequencies on a physical location generally improves the wireless service in that location, it can also introduce problems. When a WCD associated with a wireless coverage area using a first carrier frequency moves from a first location with a greater number of wireless coverage areas to a second location with a smaller number of wireless coverage areas, the second location's wireless coverage areas may not support the first carrier frequency. Consequently, the WCD may have to tune to a second carrier frequency that is supported by a wireless coverage area in the second location. While the WCD is tuning, the WCD may miss certain messages sent to it by the RAN. This can result in the WCD's user experiencing poor service.

In one such case, an incoming communication session for the WCD arrives at the RAN, and the RAN needs to notify the WCD of the session. This session may be, for example, a voice call, a multimedia call, or data communication, and system behavior may differ based on whether the WCD is "idle" or "active." An "idle" WCD is not already on another voice call or otherwise involved in an ongoing communication session. An "active" WCD is already on an ongoing voice call or otherwise involved in an ongoing communication session.

For purposes of example, consider the case of an incoming voice call. To notify the WCD of the incoming voice call, the RAN may page the WCD. An idle WCD that receives a page will typically indicate to the end user that they are being called (i.e., the WCD will "ring"). On the other hand, an active WCD that receives a page will typically indicate to the end user that a new call is incoming and may give the user an option to switch from the ongoing call to the new call (i.e., "call waiting").

Typically, a RAN pages a WCD by transmitting page request messages on a paging channel. The paging channel is an air interface channel used for to paging functions, and is associated with the carrier frequency of its wireless coverage area. The RAN may support one or more paging channels per wireless coverage area. Each paging channel may be divided, via time division multiplexing, into a number of time slots, in some of which the RAN can transmit a page request message to a particular WCD.

A WCD preferably conserves battery power by listening to the paging channel only during specific time slots. A given "slot cycle index" (SCI) defines the time slots at which the WCD will check the paging channel for a page request message. For instance, under cdma2000®, a WCD operating at slot cycle index 0 (zero) would listen for a page request message every 1.28 seconds, a WCD operating at slot cycle index 1 would listen for a page request message every 2.56 seconds, a WCD operating at slot cycle index 2 would listen for a page request message every 5.12 seconds, and so on. The SCI of a particular WCD is typically configured in the RAN, but may be overridden by the WCD, or may be negotiated between the WCD and RAN. Furthermore, the SCI may take on values less than 0 (zero) and greater than 2.

When the WCD receives a page request message, it will normally respond to the RAN with a page response message. Under cdma2000®, a WCD preferably transmits the page response message to the RAN on an access channel, which is another type of channel supported by the air interface. After the RAN receives the page response message from the WCD, the RAN preferably affirms the receipt of the page response message by transmitting a base station acknowledgement message to the WCD on the paging channel.

For an idle WCD, once this procedure has completed, the RAN may allocate one or more traffic channels for the WCD to use for voice and/or data communication. For an active WCD, if the user indicates that he or she wants to switch to the new incoming call, the RAN may either reuse the existing traffic channels assigned to the WCD for the ongoing call, or the RAN may tear down these traffic channels and allocate new traffic channels for the new incoming call.

From time to time, messages transmitted between the RAN and WCD will fail to reach their destination. When such a failure happens, the RAN may try re-paging the WCD by transmitting another page request after waiting a period of time defined by the RAN's "paging interval." A paging interval is defined as time period that the RAN will wait before attempting to re-page a WCD. The paging interval may be independent from and not synchronized with the time slots defined by the WCD's SCI. In some networks, for example, the paging interval may be set to 7-10 seconds. This means that when a page request message is not received by a WCD, the RAN may wait one or more paging channel time slots, where these slots are defined by the WCD's SCI, before attempting to re-page the WCD.

From a user-experience perspective, it is advantageous for the WCD to receive page requests as quickly as possible. While the WCD may be successfully paged on the second or third attempt, every paging interval that the RAN waits adds delay to the establishment of the communication session. For example, consider the case of an incoming voice call where the first two page request messages are missed. In a RAN with a paging interval set to 7 seconds, a WCD could experience an additional 14 seconds or more of delay during call setup. Call setup latency is a key performance metric of wireless communication systems. Callers who experience long delays between placing a call and being notified that the call has been successfully cut-through (e.g., the caller hears a ringback tone), may think that the call has failed even though it has not. This may result in callers unnecessarily re-trying calls, which puts additional load on the service provider's network, and frustrates the callers.

Furthermore, the RAN will typically attempt to page the WCD a fixed number of times, usually a series of 2 to 5 attempts, before giving up. When the RAN gives up paging a WCD, the incoming communication session fails to be established, and can also result in a poor user experience and frustrated callers. Thus, the service provider needs to balance the pros and cons of various paging strategies, in accordance with a WCD's SCI.

Overview

Disclosed herein are methods and systems for improving paging of WCDs. Unnecessary latencies may be avoided or mitigated in scenarios where a RAN transmits a page request message of a series of page request messages while a WCD is tuning from a first carrier frequency to a second carrier frequency. The RAN normally transmits a page request message on the first carrier frequency then waits a time interval to receive a page response message from the WCD. If the RAN does not receive the page response message within the time interval, the RAN transmits the next page request message in the series on the first carrier frequency, according to the WCD's SCI.

In a first embodiment, the RAN determines that the WCD has tuned to a second carrier frequency. Responsive to discovering this change and without waiting for the current time interval to expire, the RAN transmits a subsequent page request message of the series on the second carrier frequency, according to the WCD's SCI. In a second embodiment, the RAN also determines that the WCD has tuned to a second carrier frequency. Responsive to discovering this change and without waiting for the current time interval to expire, the RAN re-starts the entire series of page request messages on the second carrier frequency, according to the WCD's SCI.

In both embodiments, the RAN may determine that the WCD has tuned to a second carrier frequency by either: (1) the WCD notifying the RAN of the carrier frequency it has tuned to, (2) the WCD notifying the RAN that it needs to make an inter-carrier frequency handoff from a first wireless coverage area to a second wireless coverage area, and the RAN instructing the WCD of a new carrier frequency to which it should tune, or (3) some other technique.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

DESCRIPTION

1. Wireless Communication Networks

Figure 1:
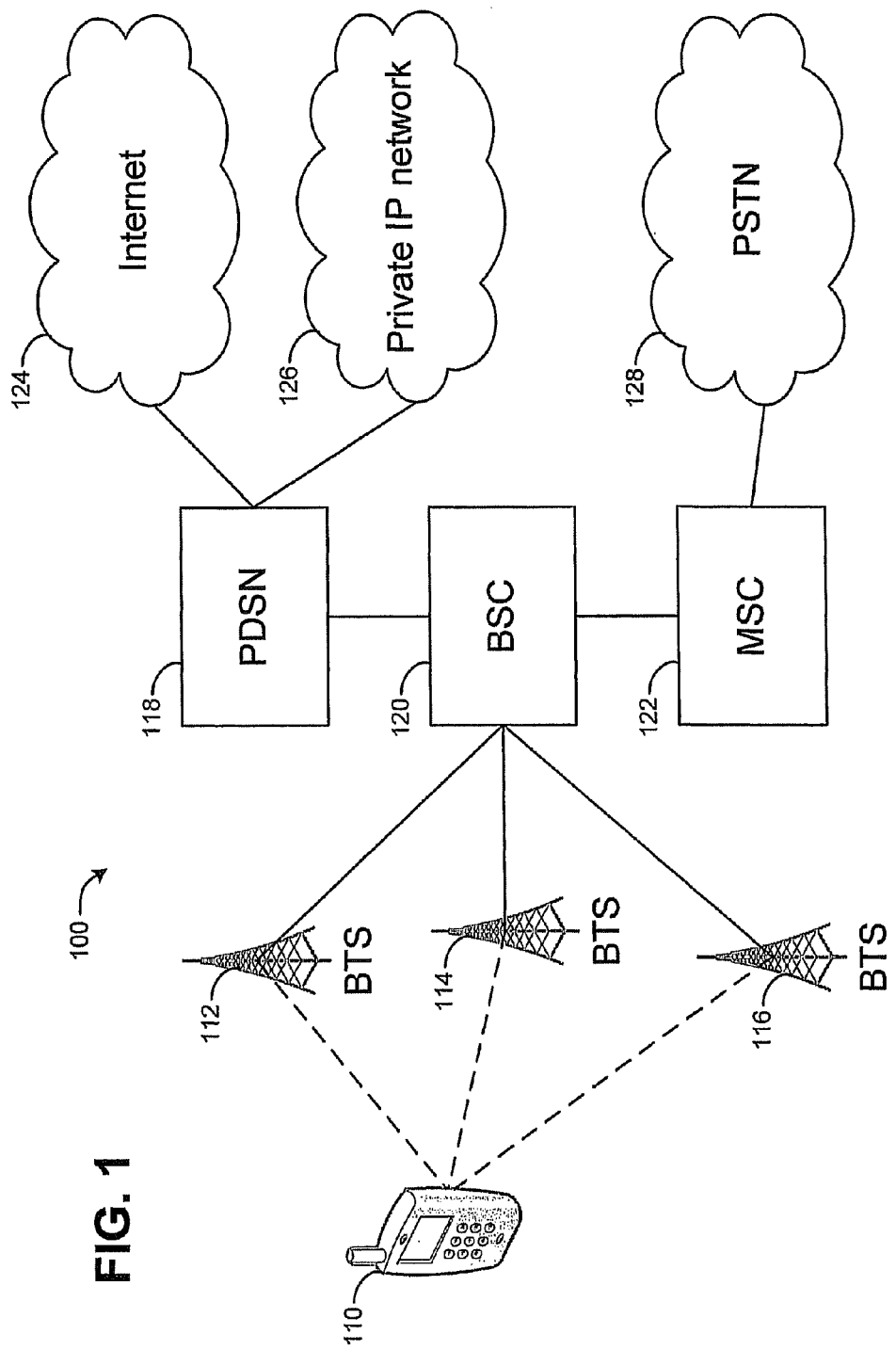
FIG. 1 is a block diagram of a communication network in accordance with an exemplary embodiment.

FIG. 1 is a simplified block diagram of an exemplary communication network 100, in which exemplary embodiments may be employed. Network 100 includes base transceiver stations (BTSs) 112, 114, 116 that can communicate with a WCD 110 via a plurality of wireless coverage areas. WCD 110 could be a wireless telephone, wireless personal digital assistant, wirelessly equipped laptop computer, wireless router, or other type of mobile or fixed wireless device.

BTSs 112, 114, 116 radiate to define the wireless coverage areas. Each wireless coverage area provides air interface access to WCD 110 and any other WCDs served by the wireless coverage area. A single BTS 112, 114, 116 may define one or more wireless coverage areas. The air interface may include a forward link transmitted from the BTS to WCD 110 and a reverse link transmitted from WCD 110 to the BTS. WCD 110 exchanges signaling, voice, data, video, or other media with the BTS through the forward and reverse links. In this regard, WCD 110 may use the wireless coverage areas defined by BTSs 112, 114, 116 to communicate with one or more endpoints, e.g., other WCDs, e-mail servers, world wide web servers, gaming servers, media servers, media gateways, or location-based services, via a packet-switched network (e.g., the Internet 124 or private IP network 126), and/or a circuit-switched network, such as the public switched telephone network (PSTN) 128. For example, BTSs 112, 114, 116 may be communicatively coupled to a base station controller (BSC) 120. BSC 120 may, in turn, be communicatively coupled to packet-switched networks 124, 126 via a packet data serving node (PDSN) 118. Alternatively or additionally, BSC 120 may be communicatively coupled to PSTN 128 via a mobile switching center (MSC) 122.

Although FIG. 1 shows only three BTSs 112, 114, 116, network 100 may include fewer or more than three BTSs. These BTSs may be communicatively coupled to BSC 120 or to other network elements that are communicatively coupled to packet-switched networks 124, 126 and/or PSTN 128. Furthermore, WCD 110 may be able to transfer ongoing communication sessions from one BTS to another in a handoff process. Network 100 may also include multiple BSCs 120, PDSNs 118, and MSCs 122. The combination of network elements including BTSs 112, 114, 116, BSC 120, PDSN 118, and MSC 122 may be collectively referred to as a RAN. However, a RAN may also be defined to comprise more or fewer elements. For example, a RAN may comprise a single BTS and a single BSC. Furthermore, these elements may be combined with one another; for example, a BTS and a BSC may be physically co-located or may be components of the same physical element.

The entity or entities of the RAN preferably include at least one processor, data storage, and program instructions stored in the data storage and executable by the processor to carry RAN functions described herein. Similarly, a WCD preferably includes at least one processor, data storage, and program instructions stored in the data storage and executable by the processor to carry out WCD functions described herein.

2. Paging in Wireless Communication Networks

Figure 2:
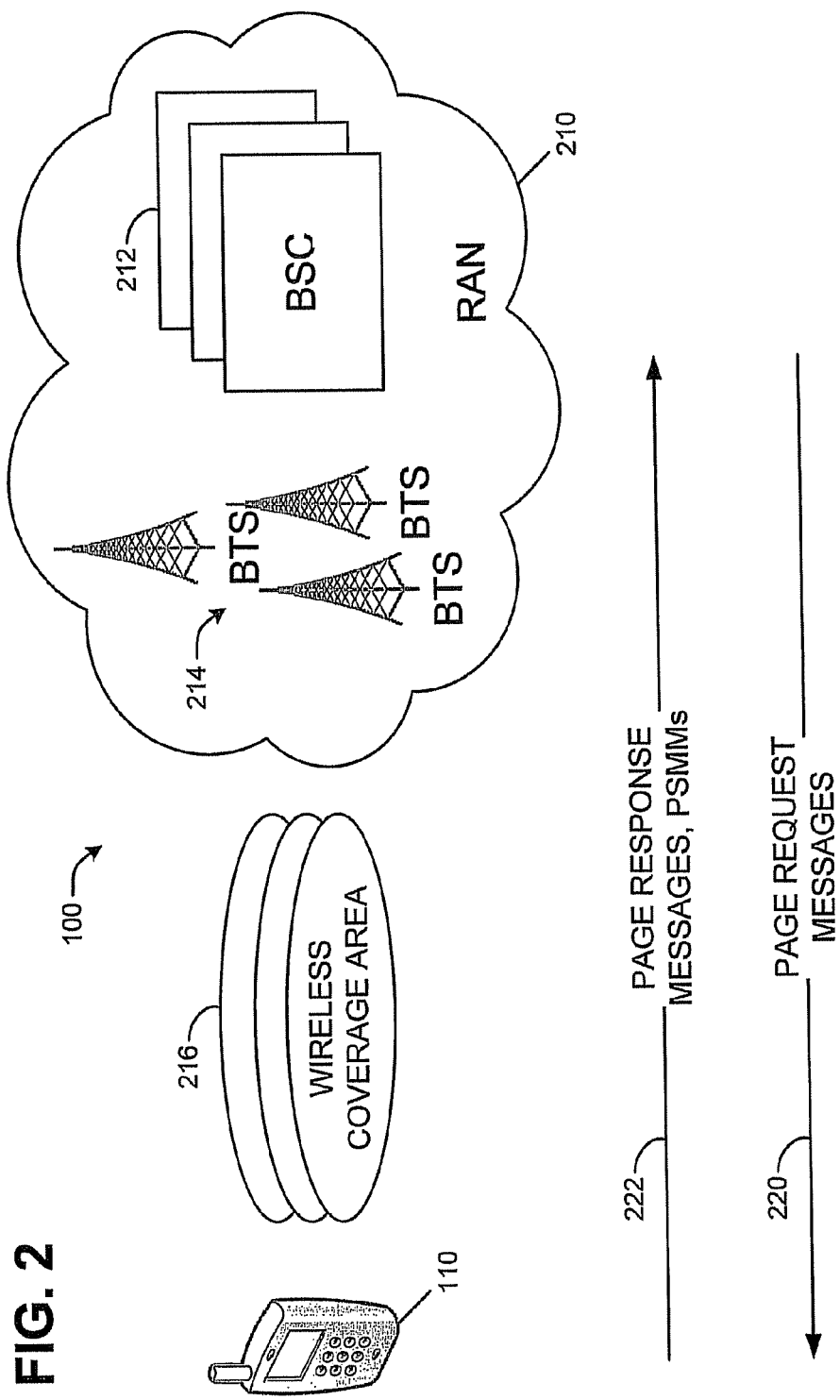
FIG. 2 is another block diagram of a communication network in accordance with an exemplary embodiment.

FIG. 2 defines an alternative view into communication network 100. Here, RAN 210 comprises BSCs 212 and BTSs 214. The latter radiate to define wireless coverage areas 216, through which RAN 210 communicates with WCD 110. At any time, WCD 110 may be associated with one or more wireless coverage areas 216. Signaling communications transmitted from RAN 210 to WCD 110 are said to be transmitted in a forward direction 220, and for purposes of this discussion may include page request messages and base station acknowledgement messages. Similarly, signaling communications transmitted from WCD 110 to RAN 210 are said to be transmitted in a reverse direction 222, and for purposes of this discussion may include page response messages and messages indicating that WCD 110 may hand off or has handed off to a different carrier frequency. For example, pilot strength measurement messages (PSMMs) may be used for this latter purpose, but other messages sent by WCD 110 to RAN 210 could also be used. However, signaling communications in both directions are not limited to these messages and may include many different types of messages.

Communications between WCD 110 and RAN 210 take place over a plurality of air interface channels, including one or more paging channels, access channels, and traffic channels. For sake of convenience these channels may operate on one or more "carrier frequencies." However, each "carrier frequency" may comprise a single air interface frequency, a set of frequencies, a single band of air interface frequencies, multiple air interface frequency bands, or multiple sub-carrier frequencies within a frequency band. As physical layer technology continues to evolve and improve, yet other configurations of may be included in the "carrier frequency" term. In an exemplary embodiment, the carrier frequencies use code division multiple access (CDMA) in accordance with cdma2000® specifications, and each may comprise 1.25 Mhz of bandwidth. However, other air interface formats, such as those of Worldwide Interoperability for Microwave Access (WIMAX) or Universal Mobile Telecommunications System (UMTS), could be used.

Wireless coverage areas 216 in FIG. 2 may be implemented by spacing their respective carrier frequencies at an appropriate distance in the frequency domain. This way, multiple overlapping wireless coverage areas, each associated with a carrier frequency, can be supported in the same physical location. Likewise, wireless coverage areas 216 could also be implemented by associating all of them with the same carrier frequency, but spacing their extent of coverage at an appropriate physical distance so that they do not interfere with one another. Of course, wireless coverage areas 216 could also be implemented according to a combination of both frequency domain and physical spacing.

Figure 3:
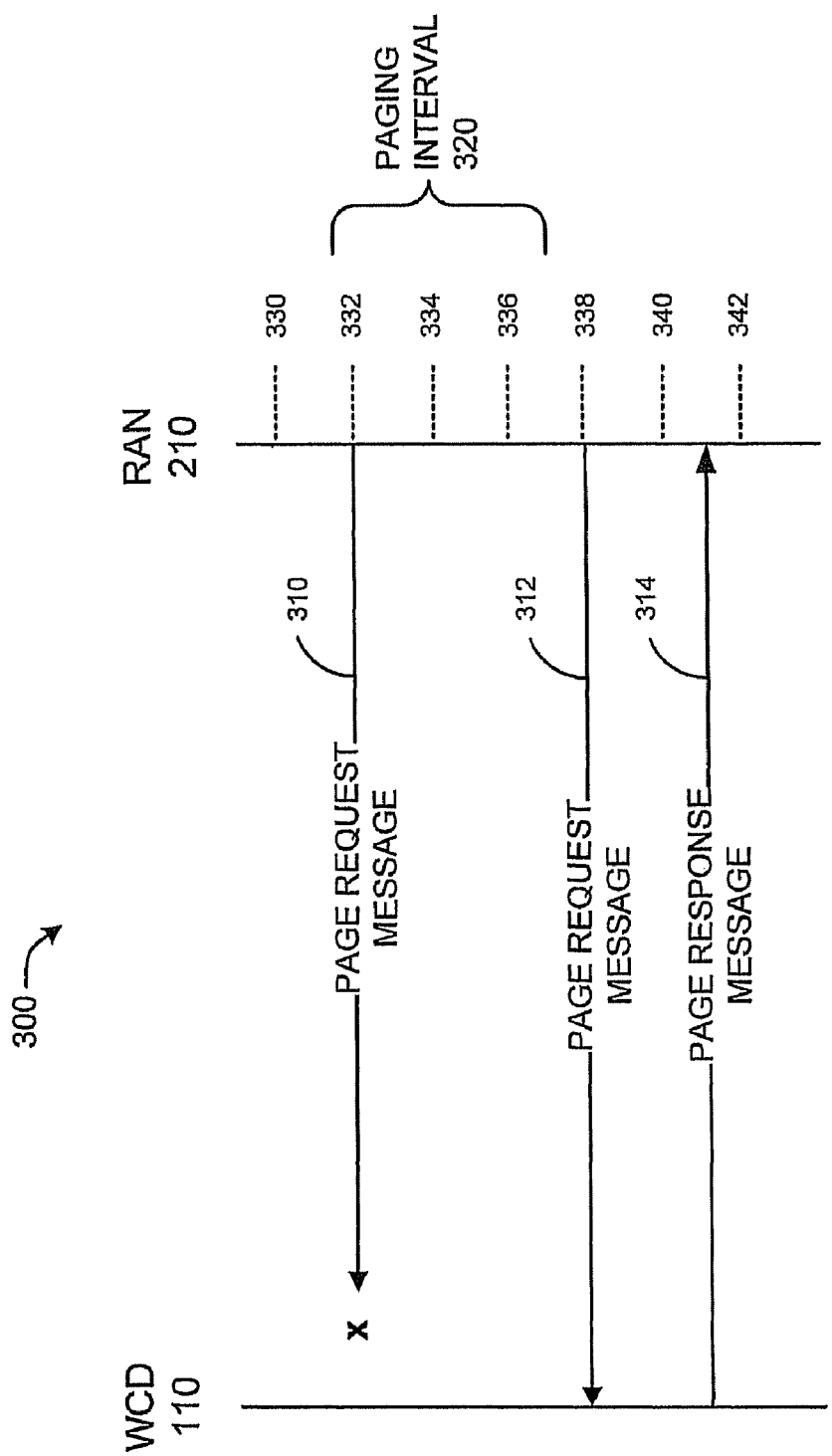
FIG. 3 is a message flow diagram in accordance with an exemplary embodiment.

FIG. 3 is a message diagram 300 that illustrates the operation of paging channels. Each paging channel may be divided into a number of time slots in which RAN 210 can transmit a page request message 310, 312 to WCDs, per each WCD's SCI. In FIG. 3, time slots 330, 332, 334, 336, 338, 340, and 342 are when WCD 110 will listen for a page request message from RAN 210, according to WCD 110's SCI. The time slots in which other WCDs served by RAN 210 will listen to the paging channel are not shown.

RAN 210 typically pages WCD 110 so that WCD 110 can establish a traffic channel to transmit and/or receive data, voice, video or multimedia traffic. For example, if WCD 110 is the intended recipient of an incoming circuit voice call, push to talk (PTT) call, voice over IP (VoIP) call, multimedia session, or data communication session, RAN 210 may page WCD 110. In doing so, RAN 210 may transmit one or more page request messages 310, 312. Upon receipt of a page request message, WCD 110 may reply with a page response message 314. After this initial transaction, RAN 210 preferably transmits a base station acknowledgement message to WCD 110 on the paging channel (not shown).

If WCD 110 is idle, WCD 110 preferably indicates the incoming communication session to its user (e.g., it may "ring"). If WCD 110's user accepts the incoming communication session, WCD 110 preferably informs RAN 210 of this fact, and RAN 210 may subsequently allocate one or more traffic channels for WCD 110 and notify WCD 110 that it may use these particular channels for communication sessions.

If WCD 110 is active, WCD 110 preferably indicates the incoming communication session to its user (e.g., with a "call waiting" indication). If WCD 110's user accepts the incoming communication session, WCD 110 preferably informs RAN 210 of this fact, and RAN 210 may either tear down the traffic channels currently assigned to WCD 110 and allocate new traffic channels for the incoming communication session, or reuse the current traffic channels assigned to WCD 110 for WCD 110's ongoing session.

Regardless of whether WCD 110 is idle or active, wireless communication can be unreliable from time to time; therefore, any messages can be lost or missed by the recipient. For example, in FIG. 3, page request message 310 does not reach WCD 110. This may be due to numerous reasons, including WCD 110 being temporarily out of coverage, or tuning to or listening on a different carrier frequency. RAN 210 waits for its paging interval 320 to expire, then transmits another page request message 312 in the next paging channel time slot 338, according to the WCD's SCI. Page request message 312 reaches WCD 110, and WCD 110 replies with a page response message 314. If WCD 110 had not replied to page request message 314, RAN 210 may have waited another paging interval then transmitted yet another page request message. This process continues until either WCD 110 responds or RAN 210 transmits a configured maximum number of page request messages, and then gives up trying to reach WCD 110. In the latter scenario, RAN 210 fails to establish an incoming communication session to WCD 110. As illustrated in FIG. 3, upon the expiration of paging interval 320, the RAN may have to wait for WCD 110's next available time slot 338 on the paging channel; i.e., by waiting for paging interval 320 to expire before transmitting page request message 312, the RAN skips time slots 334 and 336, and incurs latency.

It is advantageous for the RAN to have to transmit as few page request messages as possible before the WCD responds, so that there is minimal delay in establishing communication with the WCD. For example, if WCD 110 is operating in SCI 1, the time interval between each of slots 330 and 332, slots 332 and 334, slots 334 and 336, slots 336 and 338, slots 338 and 340, and 340 and 342 would be 2.56 seconds. Therefore, RAN 210 would wait 7.68 seconds between transmitting page request message 310 and page request message 312. In the case of a voice call, the caller would suffer at least an additional 7.68 seconds of call setup delay when a page request message is not received by WCD 110.

Thus, from a user-experience point of view, it is preferable to have WCD 110 successfully receive the first page request message rather than for WCD 110 to not receive the first page request message and have to wait for RAN 210 to transmit subsequent page request message(s). To be competitive, the service provider needs the reduce the delay between when RAN 210 transmits the first page request message to WCD 110 and when RAN 210 receives a page response message from WCD 110.

3. Carrier Frequency Allocation and Inter-Carrier Frequency Handoffs

As wireless service providers evolve their networks, their usage of air interface carrier frequencies may change. Some wireless markets comprise multiple overlapping wireless coverage areas with pockets that require fewer overlapping wireless coverage areas. For example, a large city may require six carrier frequencies, each supporting wireless coverage areas throughout the city, with the exception of a park or large body of water in a particular part of the city. The wireless service provide may only need four carrier frequencies for its wireless coverage areas to adequately support the lower density of users expected in these locations.

Often, the service provider will initially provision the full number (i.e., six) carrier frequencies throughout the city, then "turn down" carriers in locations like the park and the large body of water, where the carrier frequencies are expected or have proven to be less utilized. In doing so, the service provider chooses certain carrier frequencies to eliminate from the set of carrier frequencies available in the market. This decision may be made across the entire market or within a limited location. For example, in a market defined by multiple carrier frequencies, f1, f2, f3, f4, f5, and f6, the service provider may decide to maintain carrier frequencies f1, f2, f3, and f4 throughout the market, but turn down carrier frequencies f5 and f6 in the underutilized wireless coverage areas.

Also, other less dense wireless markets may comprise a small number of overlapping wireless coverage areas, but include pockets of coverage that require more overlapping wireless coverage areas. For example, a suburb may require three carrier frequencies each supporting wireless coverage areas, with the exception of a shopping mall in a particular location within the suburb. The wireless service provider may need four or five carrier frequencies for its wireless coverage areas serving the shopping mall to adequately support the higher expected density of users. For example, in a suburb served by multiple carrier frequencies, f1, f2, and f3, the service provider may decide to add carrier frequencies f4 and f5 to the wireless coverage areas serving the general vicinity of the shopping mall.

In both of these scenarios, when a WCD that is in a location that is served by more carrier frequencies moves into a location served by fewer carrier frequencies, the WCD may have to hand off from one carrier frequency to another. In the example of the city, if a WCD served by f6 roams to a location where f6 is not supported, the WCD will have to handoff to another carrier frequency. Similarly, in the example of the suburb, if a WCD served by f4 roams to a location where f4 is not supported, the WCD will also have to handoff to another carrier frequency.

4. Idle and Active Mode Inter-Carrier Frequency Handoff

An inter-carrier frequency handoff from one wireless coverage area to another can be a complicated procedure. The series of steps required for such a handoff may vary based whether the WCD is idle or active. A WCD may determine the signal strength of each wireless coverage area within range by measuring the relative strength of each respective wireless coverage area's pilot channel. The WCD may use these measurements to determine which wireless coverage areas it should hand off to if it's serving wireless coverage area's signal strength becomes too weak.

Suppose that a WCD is idle, and the WCD determines that it needs to perform an inter-carrier frequency handoff. When in the presence of overlapping wireless coverage areas each utilizing a different carrier frequency, a WCD typically chooses a carrier frequency by using a one-way function known as a hash. Input to the hash may be a value that uniquely identifies the WCD, such as its electronic serial number (ESN) or international mobile subscriber identity (IMSI). The output of the hash is the carrier frequency on which the WCD will listen. By executing the hash on the WCD's unique identifier, the WCD may be able to derive which carrier frequency that it will listen on in a deterministic fashion. Furthermore, the hash function may be implemented so that WCDs are distributed across all of the available carrier frequencies in a substantially even fashion.

Thus, as the WCD is handed off from a first wireless coverage area to a second wireless coverage area, the WCD may re-hash to a second carrier frequency in the second wireless coverage area. However, the RAN may not be aware that the WCD is on the second carrier frequency, and may attempt to page the WCD by sending a one or more page request messages on the first carrier frequency. This paging series will likely fail.

Alternatively, the WCD may be able to inform the RAN that it has tuned to the carrier frequency, by sending a message indicating as much to the RAN after an idle mode handoff. The WCD may use an existing reverse direction signaling message or a new message may be defined explicitly for this purpose. Thus, if the WCD is in the process of being paged when it changes carrier frequencies, the RAN may be able to take steps to improve the paging process as described below.

When a WCD is active, it will inform the RAN that it needs to make an inter-carrier frequency handoff. To do so the WCD send the RAN a PSMM or some other message. The RAN is typically configured with a preferred frequency list (PFL), which is an array of carrier frequencies listed in order of preference. In other words, the first carrier frequency in the PFL is the most preferred carrier frequency, the second carrier frequency in the PFL is the second most preferred carrier frequency, and so on. From the PFL, the RAN will determine a carrier frequency to which it will assign the WCD. The exact mechanism that the RAN uses to make this determination may be more complicated than just picking a carrier frequency from the PFL in order of preference. For example, the RAN may attempt to roughly balance the number of WCDs assigned to each carrier frequency in the PFL.

As part of the signaling messages that pass between the RAN and the WCD for inter-frequency active handoff, the RAN will instruct the WCD to tune to this newly-chosen carrier frequency. Thus, the RAN is aware of the carrier frequency that the WCD is using after handoff is complete. Then, the RAN preferably checks to determine if the WCD is or was in the process of being paged, and if so the RAN may be able to take steps to improve the paging process, as described below.

Of course, more or fewer steps may be required to accomplish idle mode and active mode handoffs, and the order of these steps may vary based on the state of the RAN or the WCD, or on other factors.

5. Accommodating Inter-Frequency Handoffs while Paging

In inter-frequency handoff scenarios, a WCD may tune between carrier frequencies when the RAN is attempting to page the WCD. When this happens, a pathological scenario can occur, resulting in unnecessary delays in setting up calls. In this scenario, the RAN will determine that the WCD has handed off from a first carrier frequency to a second carrier frequency. Nonetheless, the RAN will wait according to the configured paging interval before transmitting the next page request message on the second carrier frequency's paging channel, according to the WCDs SCI. Although the WCD is ready to receive a page request message on the second carrier frequency before the paging interval expires, the RAN waits the full paging interval before transmitting the next page request message.

Barring any additional problems, such as poor wireless signal quality, the WCD can receive this subsequent page request message and reply with a page response message, allowing the incoming communication session to be processed. In general, the RAN waits an entire paging interval before attempting to re-page a WCD, so that the WCD may be able to recover from the condition that caused a previous page request message(s) to fail. But since the WCD can tune between carrier frequencies in a much shorter time period than that of a paging interval, the RAN may be able to page the WCD successfully without waiting for the paging interval to expire.

An illustrative example of this behavior follows. Suppose that a WCD is listening on carrier frequency f6 when the RAN transmits a WCD a page request message on carrier frequency f6. However, before the page request message arrives at the WCD, the WCD tunes from carrier frequency f6 to carrier frequency f4. The WCD will miss the page request message because it is no longer listening to carrier frequency f6. While the WCD may transmit a messaging indicating handoff to the RAN either before tuning to carrier frequency f4 or upon arriving at carrier frequency f4, the RAN still waits the prescribed paging interval before transmitting the next page request message to the WCD, this time on carrier frequency f4. Thus, the RAN does not page the WCD in a timely fashion.

Furthermore, the RAN will typically attempt to page the WCD a fixed number of times, usually a series of 2 to 5 attempts, before giving up. When the RAN gives up paging a WCD, the incoming communication session fails to be established. Suppose that the RAN has transmitted the final page request message of the series of page request messages. Even if the RAN subsequently detects that the WCD has changed to operate on a new carrier frequency before the final paging interval expires, the RAN may still allow the call to fail instead of restarting the paging series on the new carrier frequency.

Figure 4:
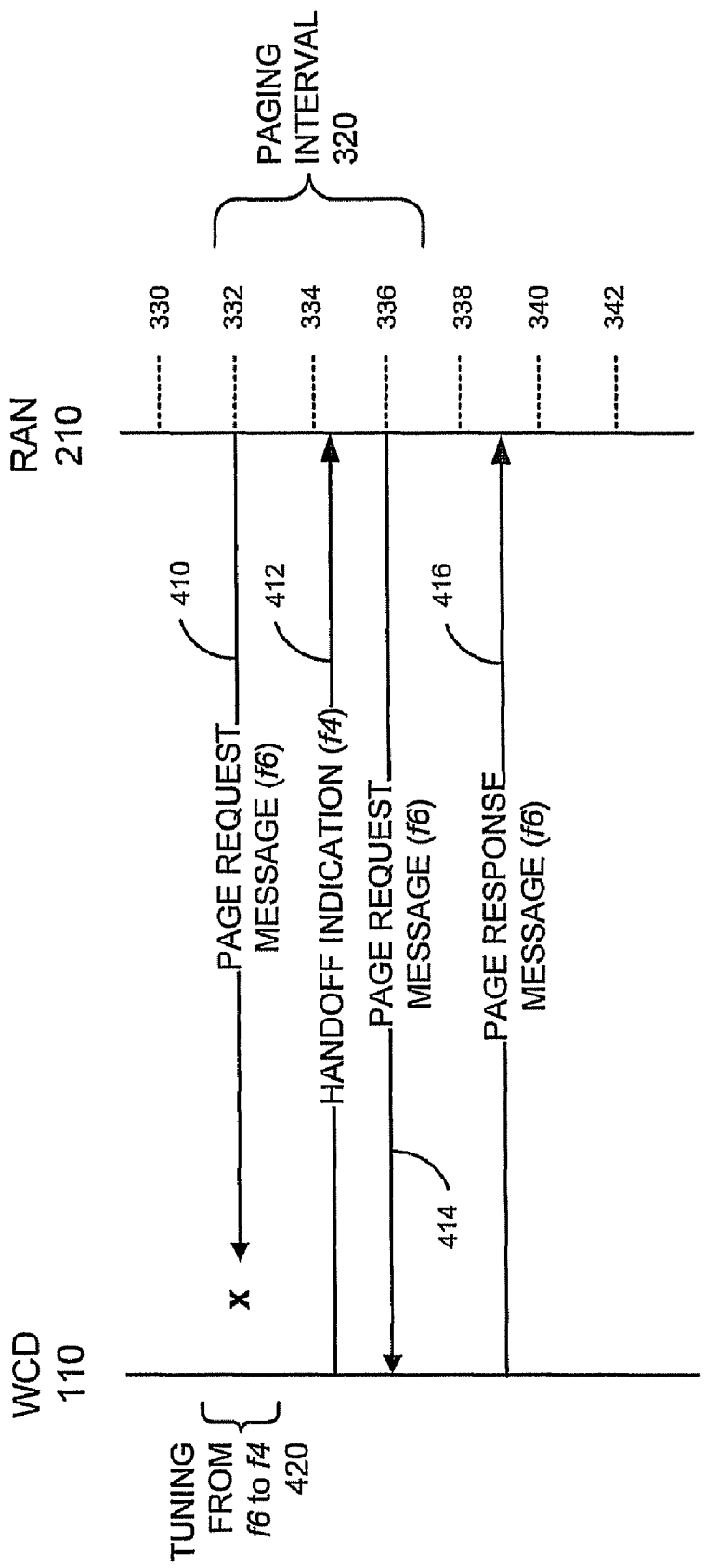
FIG. 4 is another message flow diagram in accordance with an exemplary embodiment.

FIG. 4 is a message diagram 400 that demonstrates how to avoid unnecessary and deleterious latency associated with paging a WCD while the WCD is undergoing an inter-frequency handoff. RAN 210 transmits a page request message 410 on carrier frequency f6 to WCD 110. However, WCD 110 is presently tuning 420 or has already tuned from carrier frequency f6 to carrier frequency f4, and WCD 110 does not receive page request message 410. Subsequently, WCD 110 transmits a message indicating handoff 412 to RAN 210, indicating to RAN 210 that WCD 110 is now listening on carrier frequency f4. RAN 210 preemptively transmits page request message 414 on carrier frequency f4 in WCD 110's next paging time slot, according to WCD 110's SCI. RAN 210 transmits page request message 414 without waiting for paging interval 320 to expire. WCD 110 responds on carrier frequency f4 with page response message 416. This embodiment eliminates the delay associated with waiting for the paging interval to expire, and then waiting again for an appropriate paging channel time slot per WCD 110's SCI.

Figure 5:
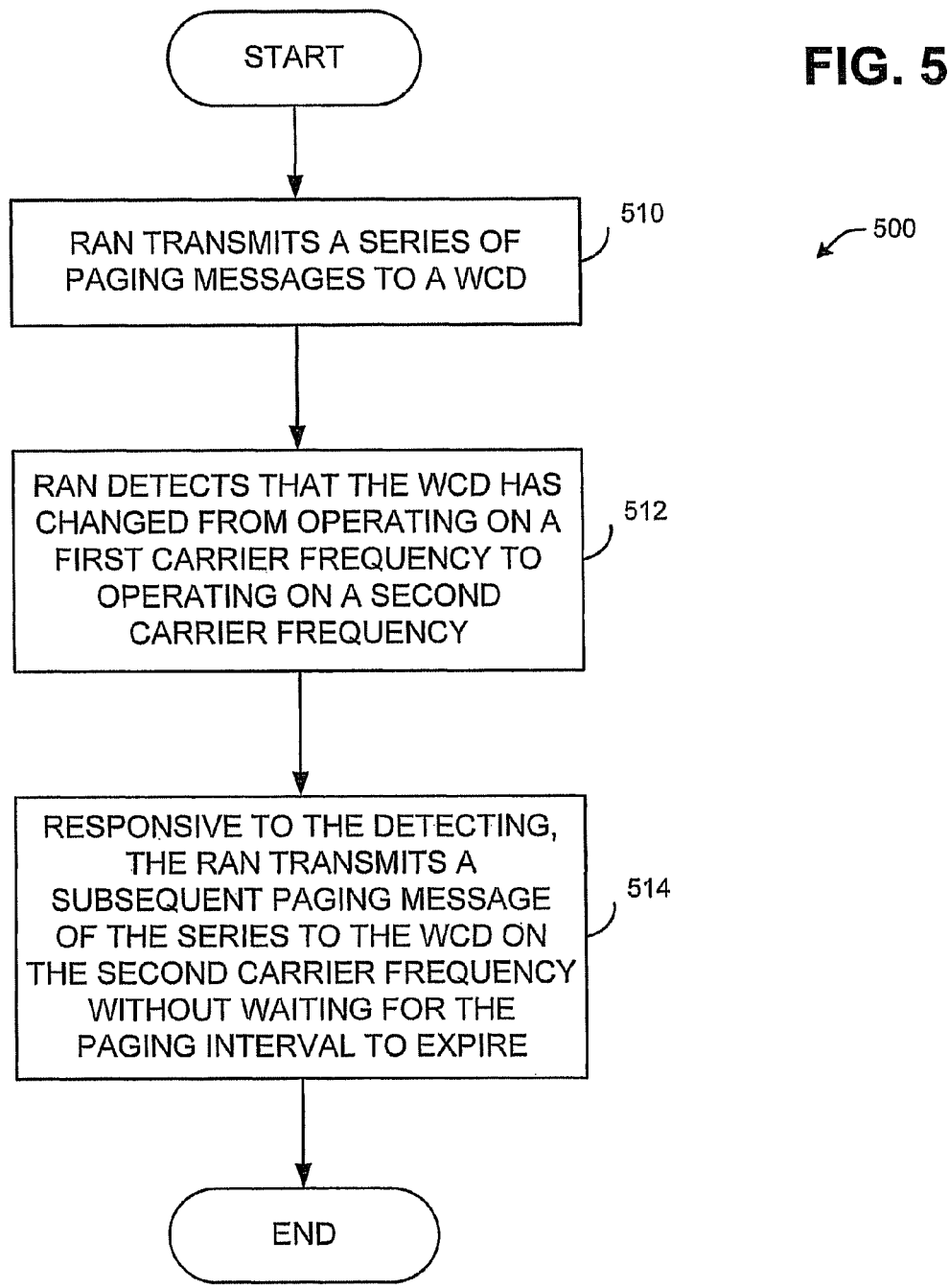
FIG. 5 is a flow chart illustrating a method in accordance with an exemplary embodiment.

FIG. 5 is a method 500 directed to an embodiment of this process. In this embodiment, a WCD in a RAN is assigned to a first paging channel that utilizes a first carrier frequency. The RAN normally transmits a page request message then waits a time interval to receive a page response message from the WCD. If the RAN does not receive a page response message within the time interval, the RAN transmits the next message in the series according to the WCD's SCI. At step 510, a RAN transmits a series of paging messages to a WCD. The RAN may transmit one or more paging messages in this step, and the paging messages are preferably transmitted in accordance with the WCD's assigned time slots on the first paging channel, per the WCD's SCI. At step 512, the RAN detects that the WCD has changed from the first paging channel operating on the first carrier frequency to a second paging channel operating on a second carrier frequency. As discussed above, this change may be due to the WCD being handed off to a new wireless coverage area, the WCD temporarily losing wireless coverage, or for some other reason. Preferably, the RAN detects the change by receiving a message indicating handoff from the WCD, but there may be other ways that the RAN can determine that the WCD has changed carrier frequencies. At step 514, the RAN, responsive to detecting the change, transmits the next paging message of the series to the WCD on the second paging channel's second carrier frequency. The RAN transmits the next paging message of the series without waiting for the paging interval to expire, and instead pages the WCD on the next time slot on the second paging channel, in accordance with the WCD's SCI.

Figure 6:
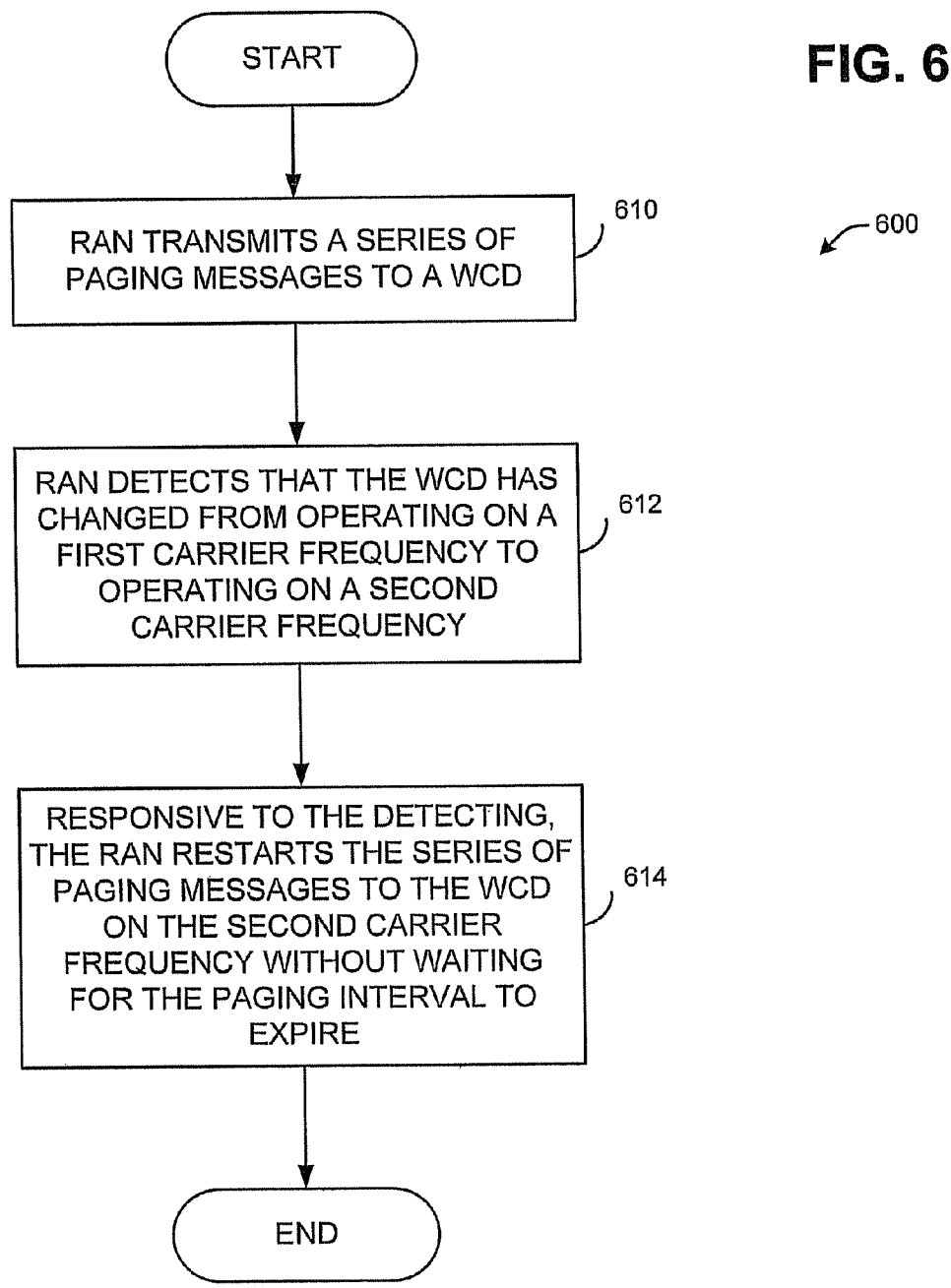
FIG. 6 is another flow chart illustrating a method in accordance with an exemplary embodiment.

FIG. 6 is a method 600 directed to a further embodiment. In this embodiment, a WCD in a RAN is assigned to a first paging channel that utilizes a first carrier frequency. The RAN normally transmits a page request message then waits a time interval to receive a page response message from the WCD. If the RAN does not receive a page response message within the time interval, the RAN transmits the next message in the series according to the WCD's SCI. At step 610, a RAN transmits a series of paging messages to a WCD. The RAN may transmit one or more paging messages in this step, and the paging messages are preferably transmitted in accordance with the WCD's assigned slots on the first paging channel, per the WCD's SCI. At step 612, the RAN detects that the WCD had changed from the first paging channel operating on the first carrier frequency to a second paging channel operating on a second carrier frequency. Again, this change may be due to the WCD being handed off to a new wireless coverage area using a different frequency, the WCD temporarily losing wireless coverage, or due to some other reason. Preferably, the RAN detects the change by receiving a message indicating handoff from the WCD, but there may be other ways that the RAN can determine that the WCD has changed carrier frequencies. At step 614, the RAN, responsive to detecting the change, restarts the series of paging messages to the WCD on the second paging channel's second carrier frequency. The RAN transmits the next paging message of the series without waiting for the paging interval to expire, and instead pages the WCD on the next time slot on the second paging channel, in accordance with the WCD's SCI. Steps 612 and 614 preferably occur when the RAN has transmitted the final page request message of the series of page request messages. However these steps could be associated with any page request message of the series of page request messages.

Both methods 500 and 600 may be conditioned on the RAN containing a profile of the WCD that indicates that enhanced paging is activated for the WCD. For example, before the RAN executes steps 514 and 614, respectively, the RAN may check the WCD's profile. If the profile indicates that the enhanced paging is activated for the WCD, the RAN will conduct these steps. If the profile indicates that the enhanced paging is not activated for the WCD, the RAN will continue normal paging procedures. By parameterizing this enhancement, the service provider can offer an enhanced paging feature to high-end users for an additional fee or as part of a premium service plan. Alternatively, the service provider could choose to deploy the enhancement gradually, for a limited number of WCDs, until the service provider has fully tested its efficacy.

Exemplary embodiments of the present invention have been described above. Those skilled in the art will understand, however, that changes and modifications may be made to these embodiments without departing from the true scope and spirit of the invention, which is defined by the claims.

What is claimed is:

1. A paging method in a wireless communication system, wherein a wireless communication device (WCD) listens in a sequence of time slots for paging messages, wherein sequential time slots of the sequence are separated from one another by a first time interval, and in which a radio access network (RAN) normally (1) transmits, in a time slot of the sequence, a paging message of a series of paging messages to the WCD, (2) waits a second time interval, (3) transmits a next paging message of the series in a next time slot of the sequence, and (4) discontinues the series upon receipt of a paging response from the WCD, the method comprising:

after transmitting a given paging message of the series, the RAN detecting that the WCD has changed from operating on a first carrier frequency to operating on a second carrier frequency; and responsive to the detecting, the RAN transmitting a subsequent paging message to the WCD on the second carrier frequency in the next time slot of the sequence without waiting for expiration of the second time interval;

wherein transmitting the subsequent paging message to the WCD on the second carrier frequency comprises restarting the series and thus transmitting a starting paging message of the series on the second carrier frequency.

2. The method of claim 1, wherein the first carrier frequency comprises a first carrier frequency band, and wherein the second carrier frequency comprises a second carrier frequency band.

3. The method of claim 1, wherein detecting that the WCD has changed from operating on the first carrier frequency to operating on the second carrier frequency comprises receiving from the WCD a signaling message indicating a change to operation on the second carrier frequency.

4. The method of claim 1, wherein the RAN radiates to define a plurality of wireless coverage areas, and wherein the WCD changes from operating on the first carrier frequency to operating on the second carrier frequency responsive to the WCD handing off from a first wireless coverage area to a second wireless coverage area.

5. The method of claim 1, wherein the RAN transmits each paging message according protocols selected from the group consisting of Code Division Multiple Access protocols and WiMAX protocols.

6. The method of claim 1, further comprising conditioning the transmission of the subsequent paging message in the next time slot of the sequence without waiting for expiration of the second time interval on a profile of the WCD indicating that enhanced paging is activated for the WCD.

7. The method of claim 6, wherein the RAN maintains the profile of the WCD.

8. The method of claim 1, wherein detecting that the WCD has changed from operating on the first carrier frequency to operating on the second carrier frequency occurs during a time interval beginning from when the RAN transmits the given paging message of the series to the WCD on the first carrier frequency.

9. A wireless communication system for support of paging comprising:

a wireless communication device (WCD) that listens in a sequence of time slots for paging messages, wherein sequential time slots of the sequence are separated from one another by a first time interval; and a radio access network (RAN) that normally (1) transmits a paging message of a series of paging messages to the WCD, (2) waits a second time interval, (3) transmits a next paging message of the series in a next time slot of the sequence, and (4) discontinues the series upon receipt of a paging response from the WCD, wherein, after transmitting a given paging message of the series, the RAN detects that the WCD has changed from operating on a first carrier frequency to operating on a second carrier frequency, and wherein responsive to the detecting, the RAN transmitting a subsequent paging message to the WCD on the second carrier frequency in the next time slot of the sequence without waiting for expiration of the second time interval; wherein transmitting the subsequent paging message to the WCD on the second carrier frequency comprises restarting the series and thus transmitting a starting paging message of the series on the second carrier frequency.

10. The system of claim 9, wherein the first carrier frequency comprises a first carrier frequency band and the second carrier frequency comprises a second carrier frequency band.

11. The system of claim 9, wherein detecting that the WCD has changed from operating on the first carrier frequency to operating on the second carrier frequency comprises receiving from the WCD a signaling message indicating a change to operation on the second carrier frequency.

12. The system of claim 9, wherein the RAN radiates to define a plurality of wireless coverage areas, wherein and the WCD changes from operating on the first carrier frequency to operating on the second carrier frequency responsive to the WCD handing off from a first wireless coverage area to a second wireless coverage area.

13. The system of claim 9, wherein the system operates in accordance with protocols selected from the group consisting of Code Division Multiple Access protocols and WiMAX protocols.

14. The system of claim 9, wherein the RAN conditions the transmission of the subsequent paging message in the next time slot of the sequence without waiting for expiration of the second time interval on a profile of the WCD indicating that enhanced paging is activated for the WCD.

15. The system of claim 14, wherein the RAN maintains the profile of the WCD.

16. The system of claim 9, wherein detecting that the WCD has changed from operating on the first carrier frequency to operating on the second carrier frequency occurs during a time interval beginning from when the RAN transmits the given paging message of the series to the WCD on the first carrier frequency.

* * * * *